UNITED STATES PATENT OFFICE.

KARL ZEININGER, OF SOMERVILLE, MASSACHUSETTS, ASSIGNOR TO THE KARL DIGESTIVE RUSK COMPANY, OF BOSTON, MASSACHUSETTS.

PROCESS OF MAKING BREAD.

SPECIFICATION forming part of Letters Patent No. 666,216, dated January 15, 1901.

Application filed May 31, 1899. Serial No. 718,796. (No specimens.)

*To all whom it may concern:*

Be it known that I, KARL ZEININGER, of Somerville, in the county of Middlesex, Commonwealth of Massachusetts, have invented a new and useful Art and Process in the Making and Cooking of Bread, of which the following is a specification.

In the making and cooking of bread it is customary to mix with the flour water and yeast in such proportions as to best produce dough that will sufficiently rise and then place the risen dough in the oven to cook into bread. Dough that is thus cooked when eaten produces gas in the stomach by reason of the acid in the bread created by its constituent parts and the manner in which it is cooked.

The object of my invention is to mix with the flour certain substances, and more particularly to so raise and cook the dough as to remove the acid out of the bread and attain bread that will be readily digested when eaten, which I accomplish in the manner hereinafter described.

My process of raising and cooking bread—that is to say, dough into bread—is applicable to the cooking and raising of the dough, the constituent parts of which are the ordinary and customary substances or parts used to mix into dough, and I do not wish to be understood that my process of raising and cooking dough into bread as herein described has particular reference to the raising and cooking of dough the constituent parts of which will be hereinafter specified.

I make my bread by the use of the following materials and substances, according to the proportion respectively set thereafter, namely: flour, one barrel; milk, seventy-two quarts; yeast, two pounds; sugar, twenty pounds; butter, thirty pounds. These several parts are thoroughly mixed together into dough that is kneaded in the usual manner. The dough is then allowed to rise to the full extent customary to allow dough to rise. It is then placed in a steam-closet after it has been manipulated into loaves and there kept for about one hour subject to steam of a pressure varying from about one pound to about five pounds pressure, according to the nature of the dough. This treatment by steam removes the acid out of the dough and acts upon the dough so as to make it a quite tender and completely homogeneous substance. In the meantime the oven is heated with quite a sharp heat, which when attained the steamed dough is quickly removed from out of the steam-closet and placed into the hot oven. The loaves of dough are then quickly cooked or baked to about near the extent of being fully baked and are then quickly removed from out of the oven back into the steam-closet and treated to the same pressure of steam, but only for a moment, as they are again quickly removed from out of the steam-closet back into the oven having a sharp heat and fully baked.

The dough must not be allowed to cool when once it has entered the steam-closet, but must be quickly handled, as just described, until it has been fully baked.

By placing the partially-baked loaf a second time into the steam-closet the steam acts upon the crust and outer portion of the loaf so as to make the crust quite soft and even throughout.

Having described my invention, I claim—

1. The placing of dough into a steam-closet and treated to steam of a pressure for about one hour after the dough has risen to the point when ready to be baked, the steamed dough then quickly placed into an oven having an intense heat proper for baking, the dough then allowed to become baked until fully baked, and then removed from out of the oven, substantially as, and for the purpose described.

2. The placing of dough into a steam-closet and treated to steam of a pressure for about one hour after the dough has risen to the point when ready to be baked, the steamed dough then quickly placed into an oven having an intense heat proper for baking, the dough allowed to cook in the oven until near the point it is fully cooked, the dough then quickly placed into the steam-closet and again subjected to the same steam treatment for a moment only, then the loaf removed back into the oven and fully baked, substantially as described.

In testimony whereof I have hereunto set hand to this application this 23d day of May, A. D. 1899.

KARL ZEININGER.

Witnesses:
THOS. WILLIAM HOBDAY,
EDWARD F. HOLLIS.